(12) United States Patent
Rangarajan et al.

(10) Patent No.: US 12,328,792 B2
(45) Date of Patent: Jun. 10, 2025

(54) SENDER ACTIVATED MOBILE CALL OVERLOADING

(71) Applicant: International Business Machines Corporation, Armonk, NY (US)

(72) Inventors: Arvind Rangarajan, Chennai (IN); Vijay Kumar Ananthapur Bache, Bangalore (IN); Srithar Rajan Thangaraj, Chennai (IN); Pradeep Raj Jayarathanasamy, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 17/553,912

(22) Filed: Dec. 17, 2021

(65) Prior Publication Data

US 2023/0199470 A1 Jun. 22, 2023

(51) Int. Cl.
*H04W 8/18* (2009.01)
*H04W 12/08* (2021.01)
*H04W 12/50* (2021.01)
H04W 88/02 (2009.01)
H04W 88/16 (2009.01)

(52) U.S. Cl.
CPC .............. *H04W 8/18* (2013.01); *H04W 12/08* (2013.01); *H04W 12/50* (2021.01); *H04W 88/022* (2013.01); *H04W 88/16* (2013.01)

(58) Field of Classification Search
CPC ....... H04W 8/18; H04W 12/50; H04W 12/08; H04W 88/022; H04W 88/16
USPC ...................................................... 455/414.1
See application file for complete search history.

(56) References Cited

U.S. PATENT DOCUMENTS

| 6,757,534 | B2 | 6/2004 | Bach et al. |
| 7,986,716 | B2 | 7/2011 | Veeramachaneni et al. |
| 8,849,247 | B2 | 9/2014 | Yu |
| 9,420,417 | B1* | 8/2016 | Agarwal ........... H04M 3/42348 |
| 9,456,298 | B2 | 9/2016 | Lee |

(Continued)

FOREIGN PATENT DOCUMENTS

| EP | 1604508 B8 | 7/2018 |
| KR | 1999-0060613 A | 7/1999 |

(Continued)

OTHER PUBLICATIONS

"Auto Message—auto reply text call sms sender app", Google Play, Printed Nov. 7, 2021, 4 pages.

*Primary Examiner* — Mark G. Pannell
(74) *Attorney, Agent, or Firm* — Kelsey Skodje

(57) ABSTRACT

A computer-implemented method for sender activated mobile call overloading (SAMCO) is described that includes processors configured for receiving request call data comprising a data request initiated by a sending mobile device intended for a receiving mobile device, receiving active call data corresponding to a telephone call placed by the sending mobile device to the receiving mobile device, wherein the active call data comprises the data request, determining that the receiving mobile device is subscribed to a data request service configured to execute the data request, determining that the sending mobile device is authorized to access the receiving mobile device, and responsive to determining that the sending mobile device is authorized, the method includes processors configured for transmitting the data request to the receiving mobile device.

20 Claims, 4 Drawing Sheets

(56) References Cited

U.S. PATENT DOCUMENTS

| | | | | |
|---|---|---|---|---|
| 10,855,664 | B1* | 12/2020 | Ziraknejad | H04W 4/02 |
| 11,776,534 | B1* | 10/2023 | Kulakarni | G10L 15/1815 |
| | | | | 704/257 |
| 2002/0025821 | A1* | 2/2002 | Clapton | H04W 8/18 |
| | | | | 455/456.3 |
| 2002/0042277 | A1* | 4/2002 | Smith | H04W 8/18 |
| | | | | 455/433 |
| 2011/0034181 | A1* | 2/2011 | Jagetiya | H04W 4/029 |
| | | | | 455/456.2 |
| 2015/0208217 | A1* | 7/2015 | Hong | H04W 4/20 |
| | | | | 455/414.1 |
| 2017/0295479 | A1* | 10/2017 | Artuso | H04W 4/30 |
| 2018/0242224 | A1* | 8/2018 | Pinheiro | H04W 74/0833 |
| 2023/0162192 | A1* | 5/2023 | Tsuda | G06Q 30/06 |
| | | | | 705/26.35 |

FOREIGN PATENT DOCUMENTS

| | | |
|---|---|---|
| KR | 10-0650452 B1 | 11/2006 |
| WO | 2013156506 A2 | 10/2013 |

\* cited by examiner

SENDER ACTIVATED MOBILE CALL OVERLOADING

BACKGROUND

The present invention relates generally to the field of telecommunications data processing, and more particularly to processing sender-based mobile call data requests.

Smartphone mobile devices enable their user's desire to engage in social activities with known individuals and strangers. Even while being equipped with a smartphone that gives its users unlimited access to social activities, smartphone users still engage in activities (e.g., sleeping, working, working out, emergencies) that prevent them from being engaged. Smartphone technologies permit their users to share data with other users depending on permissions and authorizations exchanged between the users. For example, parents provide smartphones to their children and may request their children's location through a service provided by the mobile carrier. Other types of data are shared between smartphone users to satisfy requests made by the users.

SUMMARY

Aspects of the present invention disclose computer-implemented methods, computer program products, and computer systems including one or more processors configured for receiving request call data comprising a data request initiated by a sending mobile device intended for a receiving mobile device and receiving active call data corresponding to a telephone call placed by the sending mobile device to the receiving mobile device, wherein the active call data comprises the data request. Further, the computer-implemented method includes one or more processors configured for determining that the receiving mobile device is subscribed to a data request service configured to execute the data request, determining that the sending mobile device is authorized to access the receiving mobile device. Further, responsive to determining that the sending mobile device is authorized, the computer-implemented method includes one or more processors configured for transmitting the data request to the receiving mobile device.

DETAILED DESCRIPTION

Figure 1:
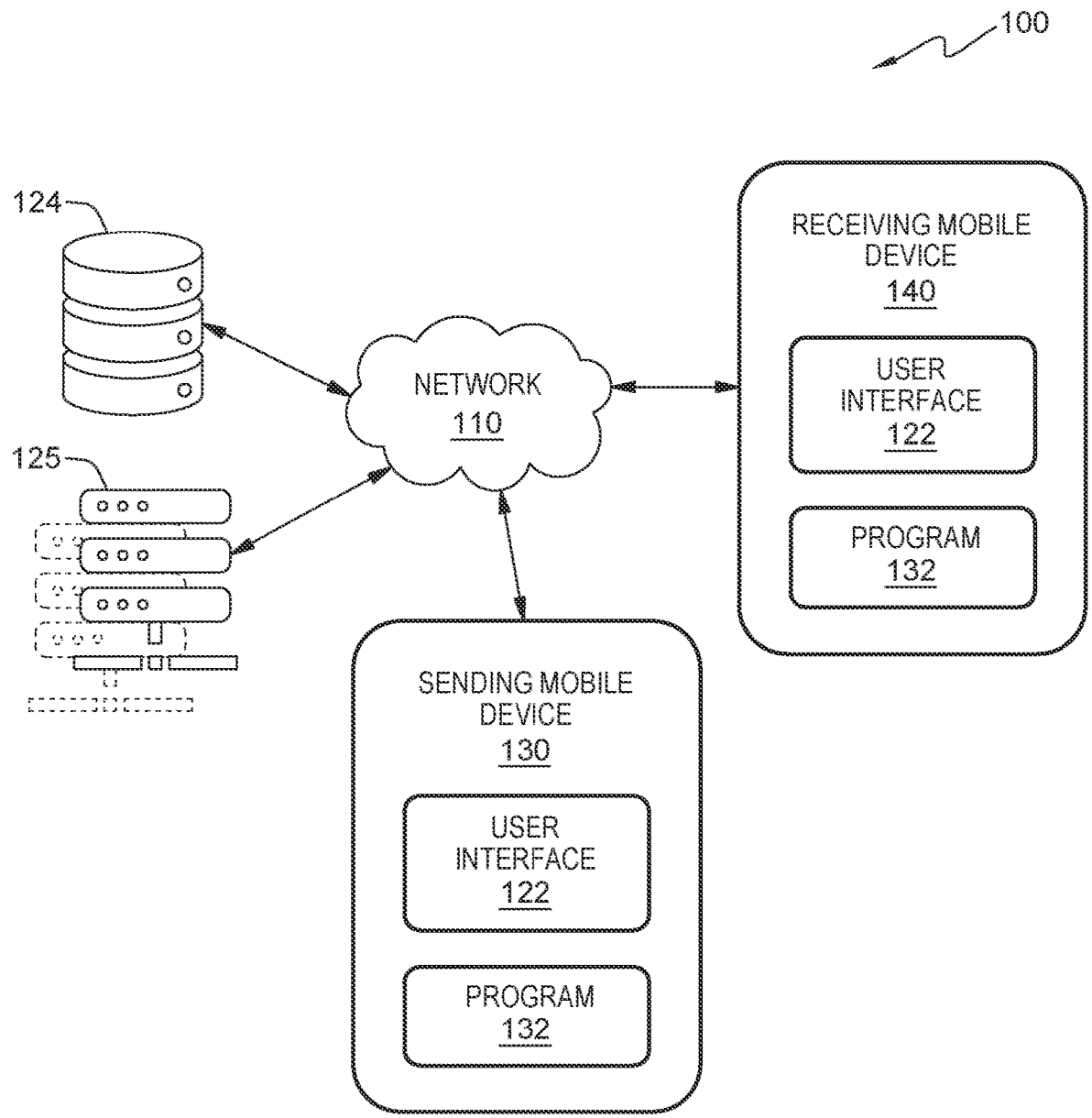
FIG. 1 depicts a network diagram of a distributed data processing environment for processing sender-based mobile call data requests, in accordance with an embodiment of the present invention.

Embodiments of the present invention recognize that mobile telephone calls may be used to make data point requests to fetch or send data (e.g., biometric data, location data) between a sender mobile device and a receiver mobile device. For example, data point requests may also be configured to activate mobile device profiles to perform actions (e.g., increase volume, adding a reminder) on a receiver mobile device. In an embodiment, the data requests may be executed by overloading the mobile telephone call with data access or profile activation requests. For example, the sender mobile device may include a request along with a mobile call and can set rules or conditions (e.g., number of rings, call decline) that must be satisfied to execute the access or activation request.

Embodiments of the present invention also recognize that a software agent may be installed and executing on the sender mobile device operating system configured to check for necessary permissions or authorizations to execute the data point request according to the rules or conditions.

Embodiments of the present invention also recognize that a key advantage may be realized when the data exchanged between the sender mobile device and the receiver mobile device are not exposed to third parties and the secure data communication channel is not vulnerable to data breaches. In other embodiments, the data requests and corresponding authorized data transfers may be executed via messaging applications, although some features may not be available as compared to a telephone call.

Embodiments of the present invention describe a sender activated/controlled rule-based framework using mobile telecommunication core network entities to request data or activate a mobile device profile on a receiver mobile device. Further, embodiments described herein may be configured to perform sender stipulated mobile call overloading with conditions and requested actions at the time of a call initiation instead of using subscription data in mobile network telecommunication entities. Furthermore, embodiments described herein may be configured to execute the remote actions by a mobile device agent executing on the operating system of the receiver mobile device by dynamically choosing the communication channel (e.g., messaging applications, SMS) based on a type of response (e.g., text, image) requested via the data request, cost, size, availability of network resource and security.

Embodiments described herein may be configured to provide enhanced capability over data retrieval using mobile core network entities, during the call initiation phase, to dynamically choose any data point from a receiver mobile device.

In an embodiment, the present invention describes computer-implemented methods, computer program products, and computer systems for sender activated/controlled rule-based framework using mobile telecommunication core network entities to request data or activate a mobile device profile on a receiver mobile device. For example, embodiments described herein may include one or more processors configured for receiving request call data corresponding to a caller using a sender mobile device, wherein the request may include a condition and an action. Further, the one or more processors may be configured for receiving active caller data corresponding to the caller placing the call with the request embedded along with media data (e.g., picture, tune).

In an embodiment, the one or more processors may be configured for parsing the embedded request and forwarding the parsed request to the receiver mobile device network. Further, the receiver mobile device network may be configured to check for embedded requests within the request call data corresponding to the call. For example, if the one or more processors detects or identifies the embedded request, the one or more processors may be configured to parse the embedded request to determine the condition and the action included in the request. Further, the one or more processors may be configured to perform a validity check, a permission check, or a feasibility of condition and action check to ensure that the receiver mobile device has authorized reception of the data request from the sender mobile device. In an embodiment, the one or more processors may be configured to terminate the call initiated by the sender mobile device if one or more of the checks fail. Alternatively, if all the checks pass, then the one or more processors may be configured to perform the action once the condition is met or satisfied.

In an embodiment, if the action involves sending any type of data, then the one or more processors may be configured to determine a response mechanism (e.g., generate mobile device agent instructions) based on configuration rules (e.g., launch native messaging application to send text messages, launch cross-platform centralized instant messaging and voice-over-IP service application to send images and videos, launch free messaging application depending on billing plan).

The present invention will now be described in detail with reference to the Figures.

FIG. 1 depicts a network diagram of a distributed data processing environment 100 for processing sender-based mobile call data requests, in accordance with an embodiment of the present invention.

FIG. 1 provides only an illustration of one embodiment of the present invention and does not imply any limitations with regard to the environments in which different embodiments may be implemented. As shown in FIG. 1, the distributed data processing environment 100 for performing sender-based mobile call data requests includes network 110 configured to facilitate communication between database 124, server 125, sending mobile device 130 and receiving mobile device 140.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between sending mobile device 130 and receiving mobile device 140. It is further understood that in some embodiments network 110 is optional and the distributed data processing environment 100 for processing sender-based mobile call data requests can operate as a stand-alone system, where in other embodiments, network 110 may be configured to enable sending mobile device 130 and/or receiving mobile device 140 to share a joint database using network 110.

User interface 122 operates as a local user interface on sending mobile device 130 through which one or more users of sending mobile device 130 interact with sending mobile device 130. User interface 122 may also operate as a local user interface on receiving mobile device 140 through which one or more users of sending mobile device 130 interact with receiving mobile device 140. In some embodiments, user interface 122 is a local app interface of program 132 (e.g., software configured to execute the steps of the invention described herein) on sending mobile device 130 or receiving mobile device 140. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 122 enables a user to transmit and receive data (i.e., to and from the program via network 110, respectively). In an embodiment, user interface 122 enables a user to opt-in to the program, input user related data, and receive alerts.

Database 124 may operate as a repository for data associated with server 125, sending mobile device 130, receiving mobile device 140, and other data transmitted within network 110. A database is an organized collection of data. For example, individual profile data may include data associated with a user associated with sending mobile device 130. Further, device profile data may include data associated with receiving mobile device 140. Database 124 can be implemented with any type of storage device capable of storing data and configuration files that can be accessed and utilized by either of sending mobile device 130 or receiving mobile device 140, such as a database server, a hard disk drive, or a flash memory. In an embodiment, database 124 may be accessed by sending mobile device 130 or receiving mobile device 140 to store data associated with sending mobile device 130 or receiving mobile device 140. In another embodiment, database 124 may be accessed by sending mobile device 130 or receiving mobile device 140 to access data as described herein. In an embodiment, database 124 may reside independent of network 110. In another embodiment, database 124 may reside elsewhere within distributed data processing environment 100 provided database 124 has access to network 110.

In the depicted embodiment, server(s) 125 may contain program 132 (e.g., software configured to execute the steps of the invention described herein) and database 124. In some embodiments, server(s) 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with sending mobile device 130 and receiving mobile device 140 via network 110. In other embodiments, server(s) 125 represents a server computing system utilizing multiple computers as a server system, such as a cloud computing environment. In yet other embodiments, server(s) 125 represents a computing system utilizing clustered computers and components (e.g., database server computers, application server computers, etc.) that act as a single pool of seamless resources when accessed within distributed data processing environment 100. Server(s) 125 may include components as described in further detail in FIG. 4.

Sending mobile device 130 and receiving mobile device 140 may be an electronic device configured for accompaniment with a user. Sending mobile device 130 and receiving mobile device 140 may be a personal electronic device such as a mobile communications device, smart phone, tablet, personal digital assistant, smart wearable device, personal laptop computer, desktop computer, or any other electronic device configured for user interaction and gathering individual information to generate an individual profile. Sending mobile device 130 and receiving mobile device 140 may include components as described in further detail in FIG. 4.

Sending mobile device 130 and receiving mobile device 140 may be configured to be controlled via a software application installed and executed thereon. Sending mobile device 130 and receiving mobile device 140, when connected to network 110, may convey usage data and other types of data corresponding to the device itself, or other devices connected via network 110, wherein the data may provide insights that are useful within the scope of the designed application.

For sending mobile device 130 and receiving mobile device 140, a device profile includes, but is not limited to, a user device identifier (ID), a device type (e.g., a smart watch, a smart phone), data usage patterns, and data usage models. Data usage patterns may include data type, data use frequency, and user device data use history. A device profile may be created for sending mobile device 130 and receiving mobile device 140 connected to network 110 within distributed processing environment 100. Sending mobile device 130 and receiving mobile device 140 may consider data usage patterns and data usage models in a device profile when determining whether to execute a data usage request by other devices connected to network 110 and within distributed data processing environment 100.

In an embodiment, a user (e.g., individual) may be permitted to opt-in and/or agree to a terms and service agreement upon setting up sending mobile device 130 and receiving mobile device 140 with network 110. The terms and service agreement may document the purpose of the information and data sharing between sending mobile device 130 or receiving mobile device 140 and provide access to services on the network that have been designated for participation in network 110. The user agreement may include all mentioned passing devices that would allow control(s), trigger(s), or action(s) to be executed based on the user's original request. For networks with multiple users and multiple mobile devices, the system may extend the usage agreement to a defined or dynamic group, upon a new user joining said group.

In an embodiment, sending mobile device 130 may be configured for receiving user input (e.g., request call data) corresponding to a call placed to receiving mobile device 140, wherein the call is placed with request comprising a rule that the receiving mobile device 140 must send back data (e.g., location data, medical data) if the call is declined or not answered after 5 ring cycles. For example, the call may include an overloaded call embedded with the request. Network 110 may be configured to receive the request call data and parse the request call data to check for request permissions established by receiving mobile device 140. Further, the one or more processors may be configured to determine that the request permissions are granted and execute the request to send back data if the condition (e.g., the call is not answered after 5 rings or declined) is satisfied.

In an embodiment, receiving mobile device 140 may be configured to receive user input data corresponding to permissions set for users associated with sending mobile devices. For example, receiving mobile device 140 may be configured to receive data corresponding to a receiving user profile comprising permissions of which a mobile device agent executing on receiving mobile device 140 must adhere to. For instance, a permission (or rule) may include allowing or not allowing receipt of data requests from users who satisfy certain user conditions. A user condition may include contacts saved in the favorites category of a contacts application.

In an embodiment, if a parent user mobile device (e.g., sending mobile device 130) receives request call data corresponding to a call placed to a child user mobile device (e.g., receiving mobile device 140), wherein the request call data includes an action to provide the location of the child user mobile device upon satisfying the condition of the call not being answered after a specific number of rings, then the one or more processors may be configured to generate mobile device agent instructions to execute the action of transmitting response call data (e.g., location data) corresponding to the current child user mobile device location to the parent user mobile device.

In an embodiment, if a child user mobile device (e.g., sending mobile device 130) receives request call data corresponding to a call placed to a parent user mobile device (e.g., receiving mobile device 140), wherein the request call data includes an action to activate a profile to set a "Happy Birthday" wallpaper on the parent user mobile device upon satisfying the condition of the parent user mobile device being set to silent mode, then the one or more processors may be configured to generate mobile device agent instructions to execute the action of setting the "Happy Birthday" wallpaper on the parent user mobile device.

In an embodiment, if a nurse mobile device (e.g., sending mobile device 130) receives request call data corresponding to a call placed to a patient user mobile device (e.g., receiving mobile device 140), wherein the request call data includes an action to fetch data (e.g., retrieve patient heart rate data, pulse oximeter data) from the patient user mobile device upon satisfying the condition of once per defined interval of time, then the one or more processors may be configured to generate mobile device agent instructions to execute the action of transmitting the response call data (e.g., patient heart rate data, pulse oximeter data) from the patient user mobile device to the nurse mobile device in a text message including the requested information.

Figure 2:
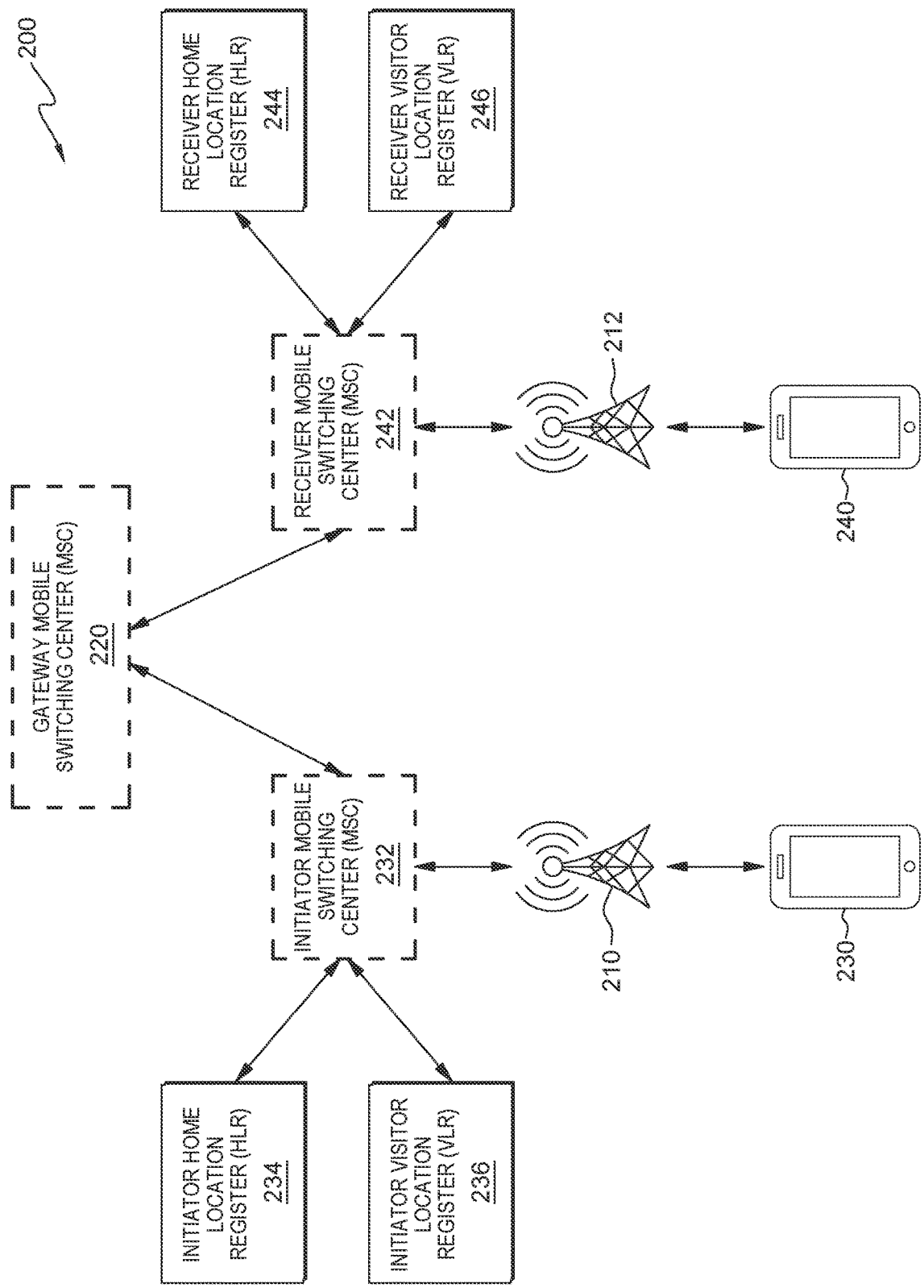
FIG. 2 depicts a block diagram of a system for processing sender-based mobile call data requests, in accordance with an embodiment of the present invention.

FIG. 2 depicts a block diagram of system 200 for processing sender-based mobile call data requests, in accordance with an embodiment of the present invention.

In an embodiment, system 200 may include gateway mobile switching center (MSC) 220 configured to execute a mobile application protocol (MAP) for sender activated mobile call overloading (SAMCO) between an initiator system (optionally via initiator MSC 232) and a receiver system (optionally via receiver MSC 242), wherein the initiator system may include initiator home location register (HLR) 234 and initiator visitor location register (VLR) 236 and the receiver system may include receiver home location register (HLR) 244 and receiver visitor location register (VLR) 246. For example, MAP may include signaling system 7 (SS7) protocol. In an embodiment, initiator mobile device 230 may be configured to establish a connection to the initiator system via initiator network 210 and receiver mobile device 240 may be configured to establish a connection to the receiver system via receiver network 212.

In an embodiment, initiator HLR 234 may be configured to generate and store user data corresponding to an initiator user associated with initiator mobile device 230 and receiver HLR 244 may be configured to generate and store receiver user data corresponding to a receiver user associated with receiver mobile device 240. Further, initiator VLR 236 may be configured to generate and store subscription data corresponding to the initiator user subscription to a data request service and receiver VLR 246 may be configured to generate and store subscription data corresponding to the receiver user subscription to the data request service.

In an embodiment, receiver mobile device 240 may be configured to receive receiver user input data corresponding to a request to subscribe to the data request service (e.g., SAMCO), wherein the user input data to request subscription may be transmitted to, and stored by, the receiver VLR 246 as receiver subscription data. Further, receiver mobile device 240 may be configured to execute a mobile application to facilitate the data request service and corresponding configuration. Further, receiver mobile device 240 may be configured to generate and periodically transmit mobile application configuration data to receiver HLR 244 via receiver MSC 242 as cache or on demand data, subject to data bandwidth limitations.

In an embodiment, initiator mobile device 230 may be configured to receive initiator user input data corresponding to a data request including a condition and data requested from receiver mobile device 240, wherein the initiator mobile device 230 may be configured to initiate the call to the receiver mobile device 240. Further, initiator network 210 may be configured to receive request call data comprising the data request corresponding to the call and to route the call to gateway MSC 220. Further, initiator MSC 232 may be configured to identify the data request and check with initiator VLR to determine if initiator mobile device 230 is subscribed to the data request service subscription. Furthermore, initiator MSC 232 may be configured to receive response call data from receiver HLR 244 via gateway MSC 220 using MAP protocol, wherein the response call data may be generated in response to the data request.

In an embodiment, the data request service may be implemented during a call initiation phase of the telephone call that occurs before the data communications switch from a data mode to a voice mode. Further, one or more of gateway MSC 220, initiator MSC 232, and receiver MSC 242 may be configured to verify with one or more of initiator VLR 236 and receiver VLR 246 whether the data request is allowed for the subscriber (e.g., initiator mobile device 230, receiver mobile device 240).

In an embodiment, initiator mobile device 230 and receiver mobile device 240 may configured to receive user input data corresponding to respective profiles, wherein corresponding profile data may be stored in the corresponding HLR (directly or via VLR), or in a completely new entity in a Global System for Mobile (GSM) communications network, or within memory of the respective mobile devices to be retrieved on demand.

In an embodiment, to reduce the volume of data flowing through gateway MSC 220, system 200 may be configured to implement additional compression mechanisms that may be leveraged from a protocol used for data transfer.

Figure 3:
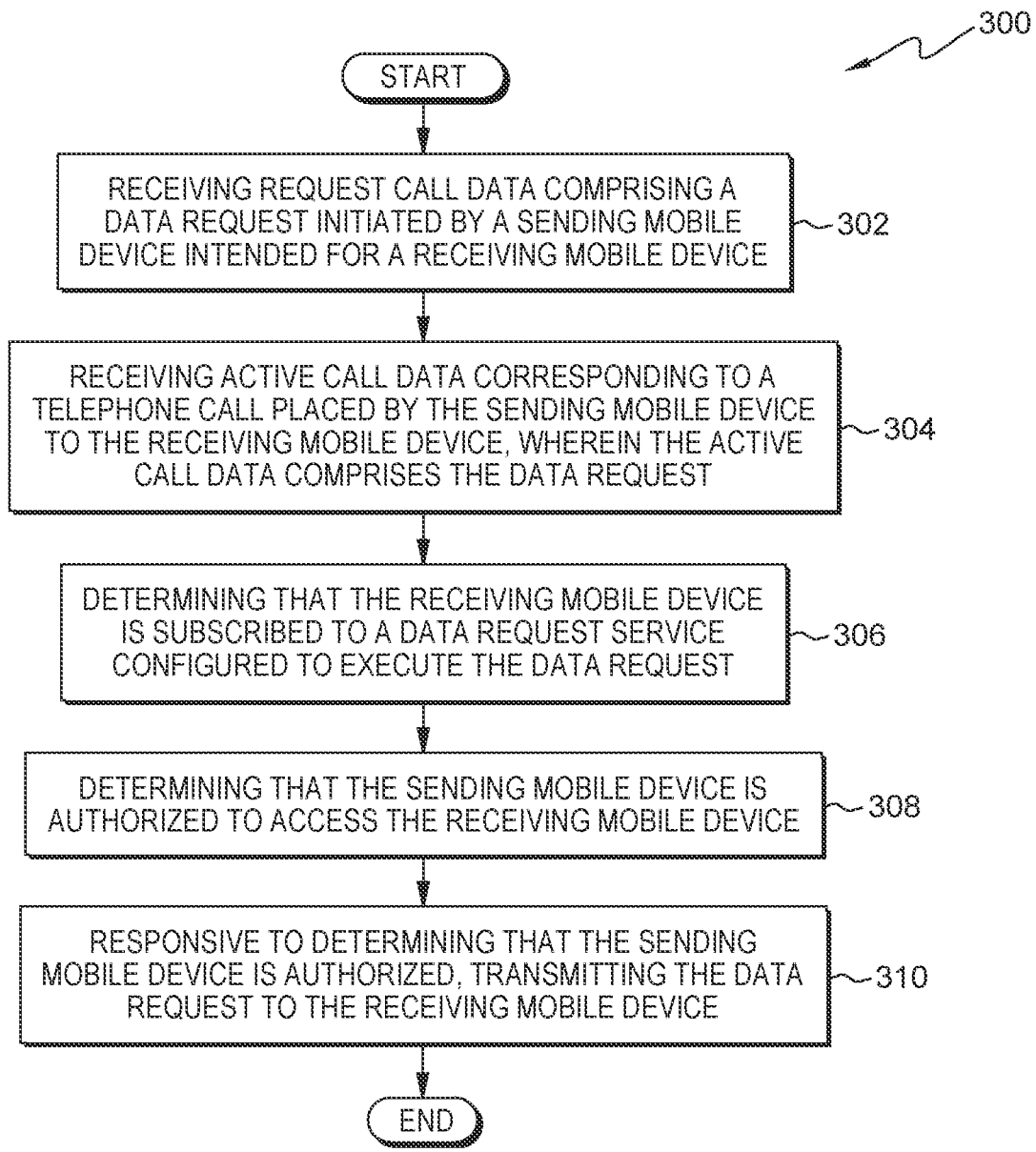
FIG. 3 depicts a flowchart of a computer-implemented method for processing sender-based mobile call data requests, in accordance with an embodiment of the present invention.

FIG. 3 depicts a flowchart of a computer-implemented method 300 for processing sender-based mobile call data requests, in accordance with an embodiment of the present invention.

In an embodiment, computer-implemented method 300 may include one or more processors configured for receiving 302 request call data comprising a data request initiated by a sending mobile device intended for a receiving mobile device. For example, the request call data may include sender mobile profile data, wherein the computer-implemented method may be configured for identifying a first user profile based on the sender mobile profile data and determining that the sending mobile device is subscribed to the data request service configured to perform the caller request based on the sender mobile profile data. Further, for example, the request call data may include receiving mobile profile data, wherein the computer-implemented method may be configured for identifying a second user profile based on the receiving mobile profile data.

In an embodiment, computer-implemented method 300 may include one or more processors configured for receiving 304 active call data corresponding to a telephone call placed by the sending mobile device to the receiving mobile device, wherein the active call data comprises the data request. For example, the telephone call may be placed by the sending mobile device via a telecommunications network comprising a gateway mobile switching center (MSC).

In an embodiment, computer-implemented method 300 may include one or more processors configured for parsing the data request to identify a condition and an action, wherein responsive to the condition being satisfied, the one or more processors may be configured for transmitting mobile device agent instructions to the receiving mobile device to execute the action.

In an embodiment, computer-implemented method 300 may include one or more processors configured for determining that the action is a fetch data action comprising fetch configuration rules or a send data action comprising send configuration rules. In an embodiment, responsive to determining that the action is the fetch data action, the one or more processors may be configured for generating the mobile device agent instructions based on the fetch data action and the fetch configuration rules. Furthermore, responsive to determining that the action is the send data action, the one or more processors may be configured for generating the mobile device agent instructions based on the send data action and the send configuration rules.

In an embodiment, computer-implemented method 300 may include one or more processors configured for determining 306 that the receiving mobile device is subscribed to a data request service configured to execute the data request. For example, receiver mobile device may be configured to receive receiver user input data corresponding to a request to subscribe to the data request service (e.g., SAMCO), wherein the user input data to request subscription may be transmitted to, and stored by, the receiver VLR as receiver subscription data. Further, the one or more processors may be configured for querying the data request service to determine if a profile corresponding to receiver mobile device includes receiver subscription data representing in indication that receiver mobile device is subscribed to the data request service configured to execute the request.

In an embodiment, computer-implemented method 300 may include one or more processors configured for determining that the sending mobile device is authorized to access the receiving mobile device. For example, similar to receiver mobile device, sending mobile device may be configured to receive sender user input data corresponding to a request to subscribe to the data request service (e.g., SAMCO), wherein the user input data to request subscription may be transmitted to, and stored by, the sending VLR as sender subscription data. Further, the one or more processors may be configured for querying the data request service to determine if a profile corresponding to sending mobile device includes sender subscription data representing in indication that sending mobile device is subscribed to the data request service configured to execute the request.

In an embodiment, responsive to determining 308 that the sending mobile device is authorized, computer-implemented method 300 may include one or more processors configured for transmitting the data request to the receiving mobile device.

In an embodiment, computer-implemented method 300 may include one or more processors configured for receiving an indication that the data request was processed by the receiving mobile device. Further, the one or more processors may be configured for receiving response call fata from the receiving mobile device or from another device, wherein the response call data includes data that is requested by sending mobile device that is the subject of the data request. Furthermore, the one or more processers may be configured for transmitting the response call data to the sending mobile device.

In an embodiment, the computer-implemented method 300 may include one or more processors configured for processing the data request to generate response call data corresponding to the data request and transmitting the response call data to the sending mobile device. For example, the receiving mobile device may include the one or more processors configured for processing the data request to generate response call data corresponding to the data request and transmitting the response call data to the sending mobile device.

Figure 4:
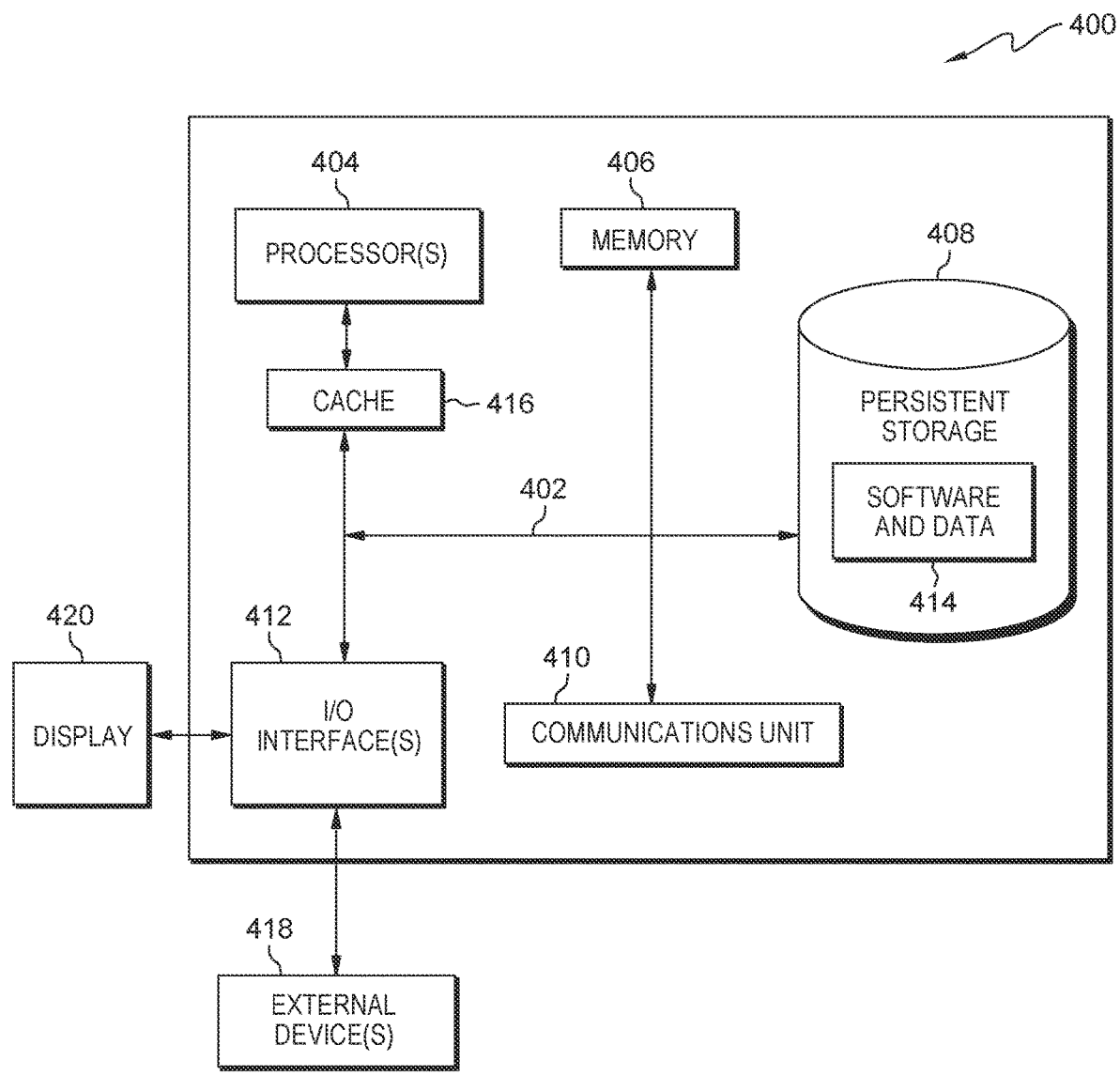
FIG. 4 depicts a block diagram of a computing device of distributed data processing environment, in accordance with an embodiment of the present invention.

FIG. 4 depicts a block diagram 400 of computing device (e.g., sending mobile device 130, receiving mobile device 140) of distributed data processing environment 100, in accordance with an embodiment of the present invention, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device (e.g., sending mobile device 130, receiving mobile device 140) includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Software and data 414 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 414 may be downloaded to persistent storage 408 through communications unit 410.

I/O interface(s) 412 allows for input and output of data with other devices that may be connected to server 125, sending mobile device 130, and/or receiving mobile device 140. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 414 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The present invention may contain various accessible data sources, such as database 124, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Software and data 414 may enable the authorized and secure processing of personal data. Software and data 414 may be configured to provide informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Software and data 414 may provide information regarding personal data and the nature (e.g., type, scope, purpose, duration, etc.) of the processing. Software and data 414 provide the user with copies of stored personal data. Software and data 414 allow the correction or completion of incorrect or incomplete personal data. Software and data 414 allow the immediate deletion of personal data.

The present invention may be a system, a computer-implemented method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, request call data comprising:
   a data request initiated by a sending mobile device intended for a receiving mobile device; and
   receiving mobile profile data;
   receiving, by one or more processors, active call data corresponding to a telephone call placed by the sending mobile device to the receiving mobile device, wherein the active call data comprises the data request;

identifying, by one or more processors and based on the receiving mobile profile data, a user profile corresponding to the receiving mobile device;

determining, by one or more processors, that the receiving mobile device is subscribed to a data request service configured to execute the data request;

determining, by one or more processors, that the sending mobile device is authorized to access the receiving mobile device; and responsive to determining that the sending mobile device is authorized, transmitting, by one or more processors, the data request to the receiving mobile device.

2. The computer-implemented method of claim 1, wherein the request call data further comprises sender mobile profile data, further comprising:

identifying, by one or more processors, a user profile corresponding to the sending mobile device based on the sender mobile profile data; and determining, by one or more processors, that the sending mobile device is subscribed to the data request service based on the sender mobile profile data.

3. The computer-implemented method of claim 1, wherein the telephone call is placed by the sending mobile device via a telecommunications network comprising a gateway mobile switching center (MSC).

4. The computer-implemented method of claim 1, further comprising:

parsing, by one or more processors, the data request to identify a condition and an action; and responsive to the condition being satisfied, transmitting, by one or more processors, mobile device agent instructions to the receiving mobile device to execute the action.

5. The computer-implemented method of claim 4, further comprising:

determining, by one or more processors, that the action is a fetch data action comprising fetch configuration rules or a send data action comprising send configuration rules;

responsive to determining that the action is the fetch data action, generating, by one or more processors, the mobile device agent instructions based on the fetch data action and the fetch configuration rules; and responsive to determining that the action is the send data action, generating, by one or more processors, the mobile device agent instructions based on the send data action and the send configuration rules.

6. The computer-implemented method of claim 1, further comprising:

receiving, by one or more processors, an indication that the data request was processed by the receiving mobile device;

receiving, by one or more processors, response call data from the receiving mobile device; and transmitting, by one or more processors, the response call data to the sending mobile device.

7. The computer-implemented method of claim 1, wherein the determining that the receiving mobile device is subscribed to the data request service comprises querying the data request service to determine if the user profile corresponding to the receiving mobile device includes receiver subscription data.

8. A computer program product, comprising:

one or more computer readable storage media and program instructions collectively stored on the one or more computer readable storage media, the program instructions comprising:

program instructions to receive request call data comprising:

a data request initiated by a sending mobile device intended for a receiving mobile device; and receiving mobile profile data;

program instructions to receive active call data corresponding to a telephone call placed by the sending mobile device to the receiving mobile device, wherein the active call data comprises the data request;

program instructions to identify, based on the receiving mobile profile data, a user profile corresponding to the receiving mobile device;

program instructions to determine that the receiving mobile device is subscribed to a data request service configured to execute the data request;

program instructions to determine that the sending mobile device is authorized to access the receiving mobile device; and responsive to the program instructions to determine that the sending mobile device is authorized, program instructions to transmit the data request to the receiving mobile device.

9. The computer program product of claim 8, wherein the request call data comprises sender mobile profile data, further comprising:

program instructions to identify a user profile corresponding to the sending mobile device based on the sender mobile profile data; and program instructions to determine that the sending mobile device is subscribed to the data request service based on the sender mobile profile data.

10. The computer program product of claim 8, wherein the telephone call is placed by the sending mobile device via a telecommunications network comprising a gateway mobile switching center (MSC).

11. The computer program product of claim 8, further comprising:

program instructions to parse the data request to identify a condition and an action; and responsive to the condition being satisfied, program instructions to transmit mobile device agent instructions to the receiving mobile device to execute the action.

12. The computer program product of claim 11, further comprising:

program instructions to determine that the action is a fetch data action comprising fetch configuration rules or a send data action comprising send configuration rules;

responsive to the program instructions to determine that the action is the fetch data action, program instructions to generate the mobile device agent instructions based on the fetch data action and the fetch configuration rules; and responsive to the program instructions to determine that the action is the send data action, program instructions to generate the mobile device agent instructions based on the send data action and the send configuration rules.

13. The computer program product of claim 8, further comprising:

program instructions to receive an indication that the data request was processed by the receiving mobile device;

program instructions to receive response call data from the receiving mobile device; and program instructions to transmit the response call data to the sending mobile device.

14. The computer program product of claim 8, wherein the determining that the receiving mobile device is subscribed to the data request service comprises querying the data request service to determine if the user profile corresponding to the receiving mobile device includes receiver subscription data.

15. A computer system, comprising:
one or more computer processors;
one or more computer readable storage media; and
program instructions stored on the one or more computer readable storage media for execution by at least one of the one or more processors, the program instructions comprising:
program instructions to receive request call data comprising:
a data request initiated by a sending mobile device intended for a receiving mobile device; and
receiving mobile profile data;
program instructions to receive active call data corresponding to a telephone call placed by the sending mobile device to the receiving mobile device, wherein the active call data comprises the data request;
program instructions to identify, based on the receiving mobile profile data, a user profile corresponding to the receiving mobile device;
program instructions to determine that the receiving mobile device is subscribed to a data request service configured to execute the data request;
program instructions to determine that the sending mobile device is authorized to access the receiving mobile device; and
responsive to the program instructions to determine that the sending mobile device is authorized, program instructions to transmit the data request to the receiving mobile device.

16. The computer system of claim 15, wherein the request call data comprises sender mobile profile data, further comprising:
program instructions to identify a user profile corresponding to the sending mobile device based on the sender mobile profile data; and
program instructions to determine that the sending mobile device is subscribed to the data request service based on the sender mobile profile data.

17. The computer system of claim 15, wherein the telephone call is placed by the sending mobile device via a telecommunications network comprising a gateway mobile switching center (MSC).

18. The computer system of claim 15, further comprising:
program instructions to parse the data request to identify a condition and an action;
responsive to the condition being satisfied, program instructions to transmit mobile device agent instructions to the receiving mobile device to execute the action;
program instructions to receive an indication that the data request was processed by the receiving mobile device;
program instructions to receive response call data from the receiving mobile device; and
program instructions to transmit the response call data to the sending mobile device.

19. The computer system of claim 18, further comprising:
program instructions to determine that the action is a fetch data action comprising fetch configuration rules or a send data action comprising send configuration rules;
responsive to the program instructions to determine that the action is the fetch data action, program instructions to generate the mobile device agent instructions based on the fetch data action and the fetch configuration rules; and
responsive to the program instructions to determine that the action is the send data action, program instructions to generate the mobile device agent instructions based on the send data action and the send configuration rules.

20. The computer system of claim 15, wherein the determining that the receiving mobile device is subscribed to the data request service comprises querying the data request service to determine if the user profile corresponding to the receiving mobile device includes receiver subscription data.

* * * * *